United States Patent
Tucker

(10) Patent No.: US 7,249,915 B2
(45) Date of Patent: Jul. 31, 2007

(54) HIGH-FLOW SEDIMENT-FREE FISH LADDER

(76) Inventor: Randall L. Tucker, 7440 Township Rd. 95, Findlay, OH (US) 45840

( * ) Notice: Subject to any disclaimer, the term of this patent is extended or adjusted under 35 U.S.C. 154(b) by 0 days.

(21) Appl. No.: 10/489,588

(22) PCT Filed: Sep. 12, 2002

(86) PCT No.: PCT/US02/29135

§ 371 (c)(1),
(2), (4) Date: Nov. 29, 2004

(87) PCT Pub. No.: WO03/023149

PCT Pub. Date: Mar. 20, 2003

(65) Prior Publication Data

US 2005/0074289 A1    Apr. 7, 2005

Related U.S. Application Data

(60) Provisional application No. 60/322,697, filed on Sep. 12, 2001.

(51) Int. Cl.
*E02B 8/08* (2006.01)
(52) U.S. Cl. .................................. 405/82; 119/219
(58) Field of Classification Search ................ 405/81, 405/82; 119/219, 220
See application file for complete search history.

(56) References Cited

U.S. PATENT DOCUMENTS

| | | | | |
|---|---|---|---|---|
| 530,655 | A | * | 12/1894 | Richardson .................. 405/81 |
| 1,730,005 | A | | 10/1929 | Grether |
| 2,094,892 | A | * | 10/1937 | Hurst .......................... 405/81 |
| 3,962,876 | A | | 6/1976 | Phillips |
| 4,260,286 | A | | 4/1981 | Buchanan |
| 4,657,434 | A | | 4/1987 | Woolnough |
| 6,588,370 | B1 | * | 7/2003 | Odeh ......................... 119/219 |

\* cited by examiner

*Primary Examiner*—Sunil Singh
(74) *Attorney, Agent, or Firm*—Fay Sharpe LLP

(57) ABSTRACT

A fishladder (10) for use along a waterway includes a channel having a bottom wall (16), a pair of opposing, up-wardly extending sidewalls (18a, b) and opposing open ends. A series of projections (20) are disposed along the channel between the opposing walls (18a, b), and a series of baffles (22) are also disposed along the channel adjacent the series of projections. The baffles (22) define a sheltered side (28), having sheltered areas with a low water flow rate in which fish can rest, and a flow side capable of carrying water having a higher water flow rate and along which fish can advance up the fish ladder. A passage (30) extends through the battles, which allows water to flow through the sheltered areas at a rate capable of preventing the build-up of sediment in the same sheltered areas, but which does not significantly impede the ability of fish to rest in these areas.

13 Claims, 5 Drawing Sheets

HIGH-FLOW SEDIMENT-FREE FISH LADDER

This application claims the priority benefit of U.S. provisional patent application Ser. No. 60/322,697, filed Sep. 12, 2001.

This invention relates to the art of fish ladders and, more particularly, to fish ladders having an improved flow rate to facilitate usage while minimizing the retention of sediment.

BACKGROUND OF THE INVENTION

Fish ladders have been provided heretofore and generally are comprised of a series of boxes positioned adjacent one another in an incrementally elevated fashion, in a stepped or ladder configuration that allows fish to migrate from one box to an upstream box. The series of boxes includes a flow inlet above an obstruction, e.g., waterfall or dam, in a waterway and a flow outlet below the obstruction. Typically the inlet is elevated from the level of the outlet so that water from the waterway will flow through the fish ladder from the inlet to the outlet. In this manner, water will flow into the uppermost box of the fish ladder, then cascade down the series of boxes to the outlet. The boxes become filled with water and, therefore, provide a series of incrementally elevated pools extending from the outlet to the inlet. Fish utilizing such a fish ladder can jump from the flow outlet into the first pool, from the first pool into the second pool, and so on, until the flow inlet is reached. At that point, the fish will be above the obstruction and can continue upstream along the waterway to its destination. Fish ladders of the foregoing nature have been in use for a considerable length of time, and are generally thought to provide an adequate alternate path for fish to use to negotiate around an obstacle in a waterway. However, such apparatuses also have a number of disadvantages and shortcomings that render them less attractive to fish and expensive to maintain.

One such disadvantage is that the boxes retain a considerable amount of sediment due to the nature of the flow of water into and out of each box. It will be appreciated that the buildup of sediment in the box is a significant disadvantage because a box that is filled with sediment may only provide a very shallow pool for the fish or, at times, no pool at all. Furthermore, during high water conditions, for example in the spring or after significant rainfall, the water carries a large amount of sediment that settles in and fills the boxes. This is, of course, detrimental to the fish migrating along the waterway that would use the fish ladder. As such, workers spend many thousands of hours each year removing sediment from the boxes of the fish ladders.

Additionally, it is well understood that fish need a certain minimum amount of water flowing along a waterway to be able to swim therealong, and that fish are naturally attracted to waterways having higher relative flow rates. These known ladders typically provide a relatively low amount of water flow during normal and low water level conditions. As such, the fish may not be attracted to the water flowing through the conventional fish ladder resulting in reduced use of the ladder by migrating fish.

Another function or feature of a fish ladder is to provide pools in which the fish can rest while advancing up the fish ladder from the lower level of the outlet to the elevated level of the inlet. During high water periods, the flow of water along the fish ladder does not cascade from box to box. Rather, the water rushes along the fish ladder creating turbulence and water currents flowing in the pools reducing the area in which the fish can rest and often times washing the fish back down the ladder to the lower level of the outlet.

Another disadvantage of existing fish ladders is the area that is commonly required to construct a conventional fish ladder formed of cascading boxes. In many situations, the fish ladder is constructed in an open area in which equipment and personnel can work. However, in other situations where a fish ladder would otherwise be desirable, the construction thereof is not possible due to space or access limitations, such as through a culvert running beneath a roadway, for example.

SUMMARY OF THE INVENTION

In accordance with the present invention, a new and improved fish ladder is provided which avoids or minimizes the problems and difficulties encountered in connection with conventional fish ladders of the foregoing nature, while promoting and maintaining a desired simplicity of structure and economy of manufacture.

More particularly in this respect, a fish ladder according to the present invention includes a channel extending between an elevated flow inlet located above the obstruction in the waterway and a lower flow outlet located below the obstruction in the waterway. The channel is preferably divided into first and second sides extending longitudinally therealong, a flow side and a shelter side. The flow side includes a series of stair-steps extending from the flow inlet to the flow outlet. Each of the stair-steps preferably has a ramp portion and a dam portion. The dam portion is on the downstream side of the ramp portion. A pool is formed between each of the ramp portions and the dam portion of the next adjacent stair-step on the upstream side. The shelter side preferably includes a series of baffles each adjacent one of the stair-steps of the flow side.

Each baffle defines a sheltered area in communication with the pool immediately downstream thereof. As such, the sheltered area is filled by water flowing into the pool from over the dam immediately upstream. Each baffle preferably has a passage, for example, near an outer wall of the channel, which allows water to flow into the sheltered area and create a current sufficient to prevent the buildup of sediment in the sheltered area, but not so great as to make it difficult for the fish to rest in the sheltered area.

Water from the inlet flows down the fish ladder along the flow side thereof. The water is maintained on the flow side by the series of baffles that divert the flowing water toward the flow side. The water flows along the ramp portion of a stair-step and over the dam portion thereof, forming a pool against the ramp portion of the next stair-step. The water in forming or entering a pool also flows into the sheltered area behind the baffle that is adjacent the upstream stair-step across which the water has just flowed. This provides a resting area for the fish that is protected by the baffle. As such, the flow side of the fish ladder can carry a significantly increased amount of water, with respect to existing fish ladders as previously discussed, while maintaining the sheltered areas in suitable condition in which the fish may rest. Furthermore, the sheltered area protects the fish from being washed downstream, even in relatively high water conditions.

Using a series of stair-steps along the flow side of the fish ladder, in accordance with the present invention, rather than a series of cascading pools as in known apparatuses, allows the water flowing through the fish ladder to move at an increased rate without disrupting the sheltered areas. As such, a higher flow rate of water is moved through the fish ladder making it more naturally attractive to the fish, and thereby increasing the likelihood that the fish will use the structure for migration. Furthermore, the high flow rate of water along the flow side does not permit sediment to settle in the pools. Additionally, the passage in each of the baffles creates a current in the water that flows through the sheltered areas which minimizes the sediment deposits in that area as well. As such, the maintenance of the structure is significantly reduced, particularly the removal of sediment deposits.

Furthermore, fish ladders constructed in accordance with the present invention can be manufactured in a variety of ways and from a various materials. Such fish ladders can be manufactured and installed as a unitary construction for installation in areas where limited access or space restrictions may make in-place construction impossible. Additionally, where access and space limitations are not an issue, or where the relative size of the fish ladder would make transportation and installation more difficult, a fish ladder in accordance with the present invention may be manufactured in segments and assembled on-site, or even manufactured in place, if appropriate. Further, fish ladders according to the present invention can be manufactured from a variety of materials, such as concrete, corrosion-resistant metal or even plastic, as would be most suitable for a particular situation.

Accordingly, the present invention provides a fish ladder capable of carrying a high flow rate of water such that fish are naturally attracted to the structure, but which also provides sheltered areas in which the fish can rest without a reduction in flow rate.

A fish ladder of the foregoing character minimizes or eliminates sedimentary deposits along the fish ladder thereby reducing or minimizing maintenance and repair of the structure without reducing the high flow rate of water or interfering with the sheltered areas in which fish can rest.

Furthermore, a fish ladder of the foregoing character also provides sheltered areas in which fish can rest out of the current of the high flow rate of water moving along the ladder.

Still other benefits and advantages of the invention will become apparent to those skilled in the art upon reading and understanding the following detailed description.

DESCRIPTION OF PREFERRED EMBODIMENT

Figure 1:
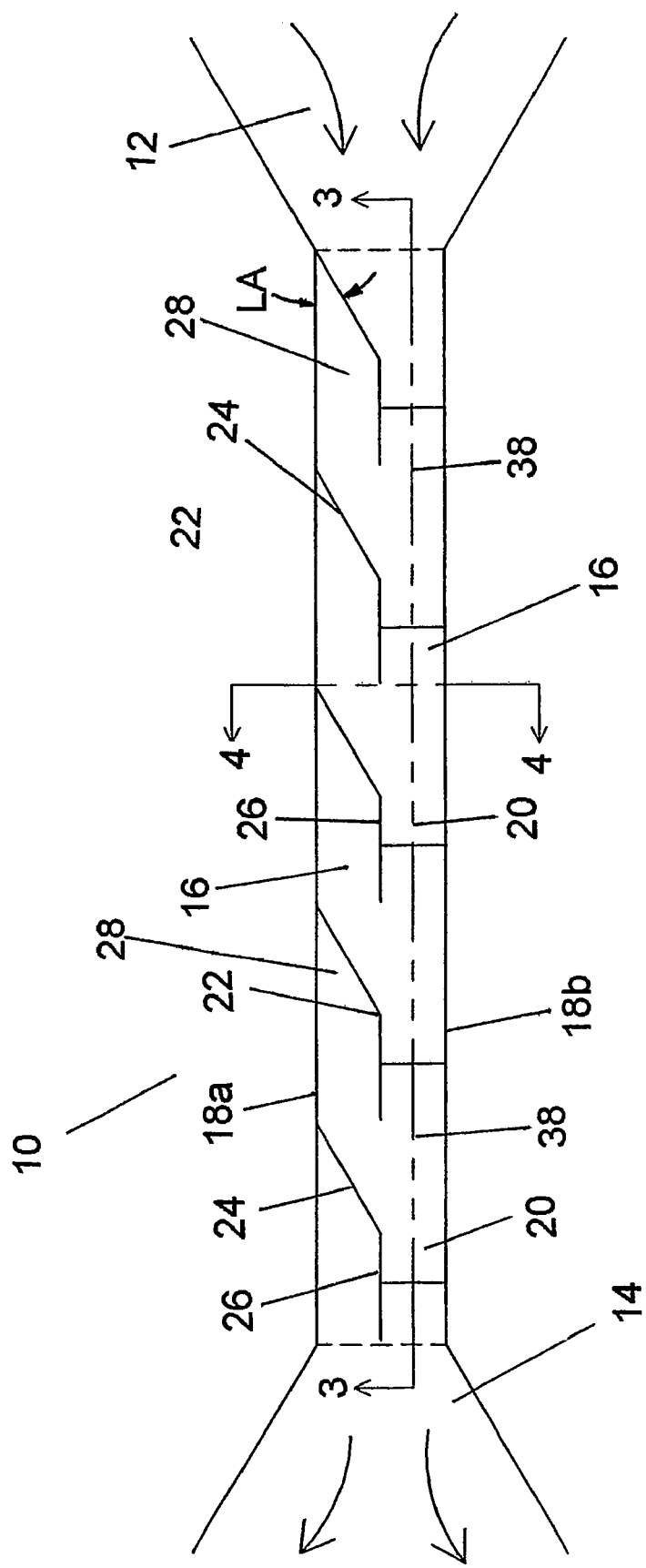
FIG. 1 is a plan view of one embodiment of a fish ladder in accordance with the present invention.
Figure 2:
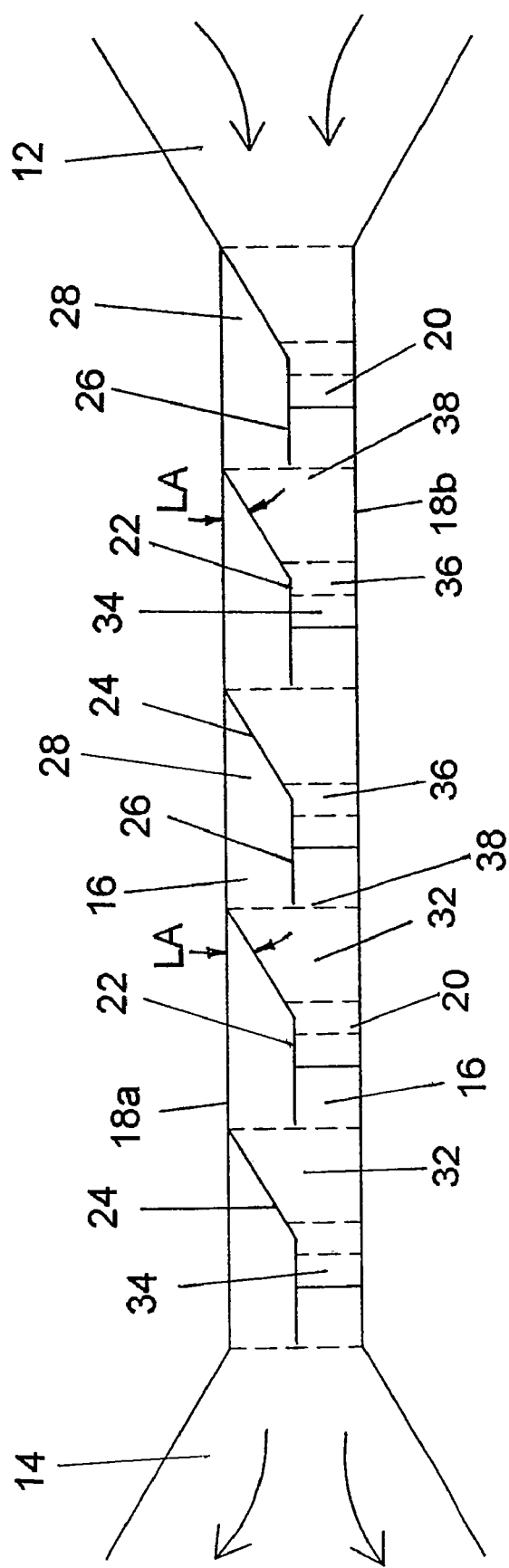
FIG. 2 is a plan view of the fish ladder of FIG. 1 further illustrating structural aspects of one embodiment of a fish ladder in accordance with the present invention.
Figure 4:
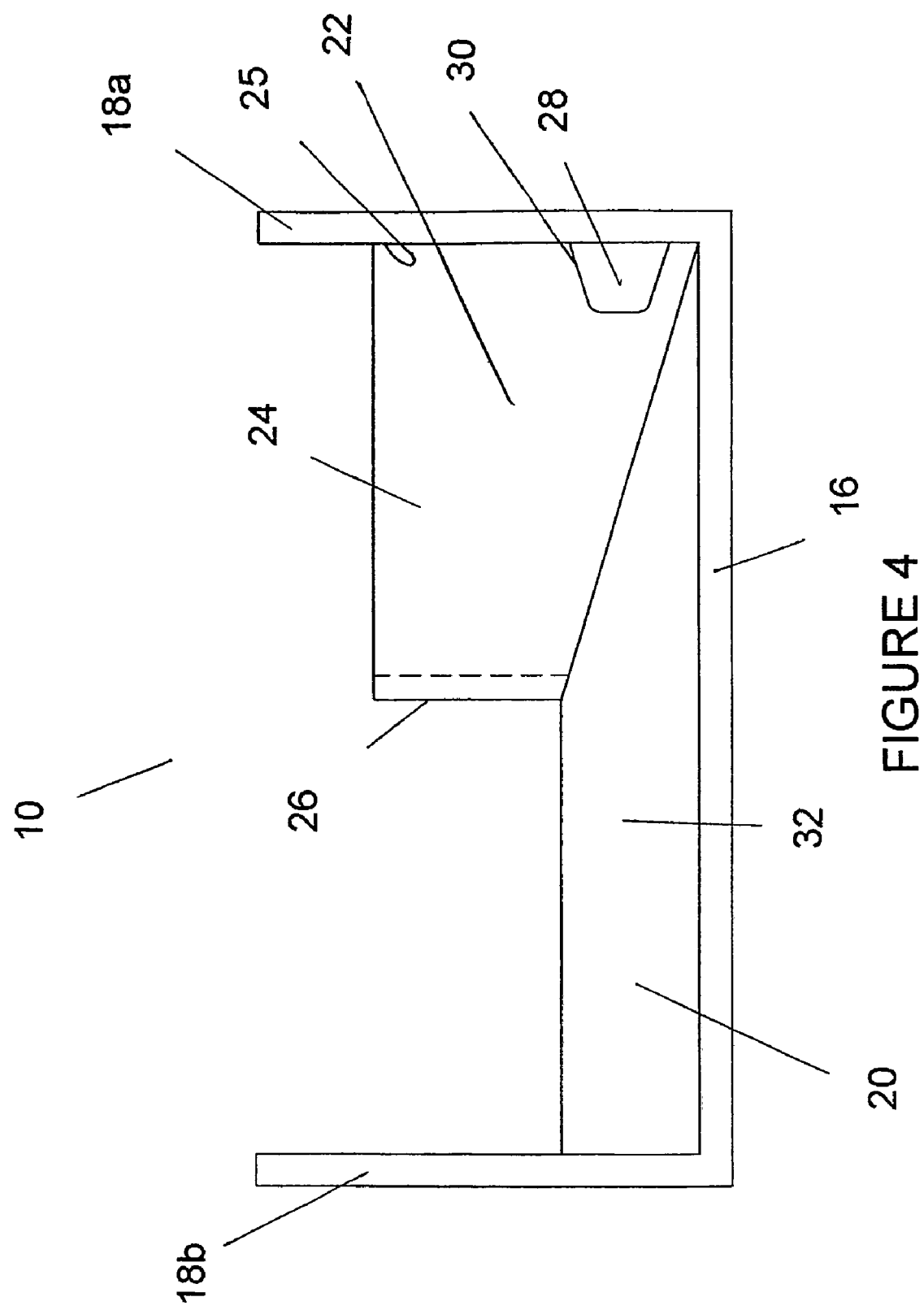
FIG. 4 is a cross-sectional view through the fish ladder taken generally along line 4—4 in FIG. 1.

Referring now in greater detail to the drawings, wherein the showings are for the purpose of illustrating preferred embodiments of the invention only, and not for the purpose of limiting the invention, FIG. 1 illustrates a fish ladder 10 extending between a flow inlet 12 and a flow outlet 14. The fish ladder has a bottom wall 16 from which a pair of spaced-apart sidewalls 18a and 18b upwardly extend. A series of projections or stair-steps 20 extend from bottom wall 16, and are longitudinally spaced apart along ladder 10. A series of baffles 22 also project from bottom wall 16, and are likewise longitudinally spaced apart along ladder 10. Each baffle 22 is generally speaking, laterally adjacent a stair-step 20, and has a diverter portion 24 and a divider portion 26. Diverter portion 24 extends from sidewall 18a in the downstream direction at an angle toward sidewall 18b, terminating or merging in the preferred arrangement at divider portion 26. The divider portion extends generally longitudinally along ladder 10 between sidewalls 18a and 18b, and includes a trailing edge 27 that extends upwardly from the bottom wall at an acute angle TA. In FIGS. 1, 2 and 4, divider portion 26 is shown spaced approximately midway between sidewalls 18a and 18b. However, it will be appreciated that the position of divider portion 26 and, likewise, the proportions of the other features of the walls, diverter portion and divider portion may vary relative to the sidewalls without departing from the subject invention.

Diverter portion 24 of baffles 22 originates from sidewall 18a and extends toward sidewall 18b at a downstream angle LA and terminates at or merges into divider portion 26 (FIG. 1). A sheltered area 28 is formed downstream of diverter portion 24 between divider portion 26 of the baffle and sidewall 18a. Bottom wall 16 forms the bottom of sheltered area 28. A flow passage 30 (FIG. 4) extends into or communicates with sheltered area 28 through diverter portion 24 of baffle 22 adjacent sidewall 18a. A portion of the water flowing through he fish ladder flows through passage 30 and into sheltered area 28 providing sufficient current to minimize sedimentary deposits in the sheltered area, and thereby reducing maintenance of the structure, while still permitting the area to remain sufficiently sheltered to provide a quiescent area where fish advancing through the fish ladder may pause. In certain constructions, the diverter portion of the baffles may include a leading edge 25. In other constructions, however, the baffles may integrally extend from the sidewall. It should be appreciated that flow passage 30 may include one or more holes or passages of any shape or configuration, or may alternately exist as a gap (not shown) extending at least partially between leading edge 25 and sidewall 18a.

Figure 3:
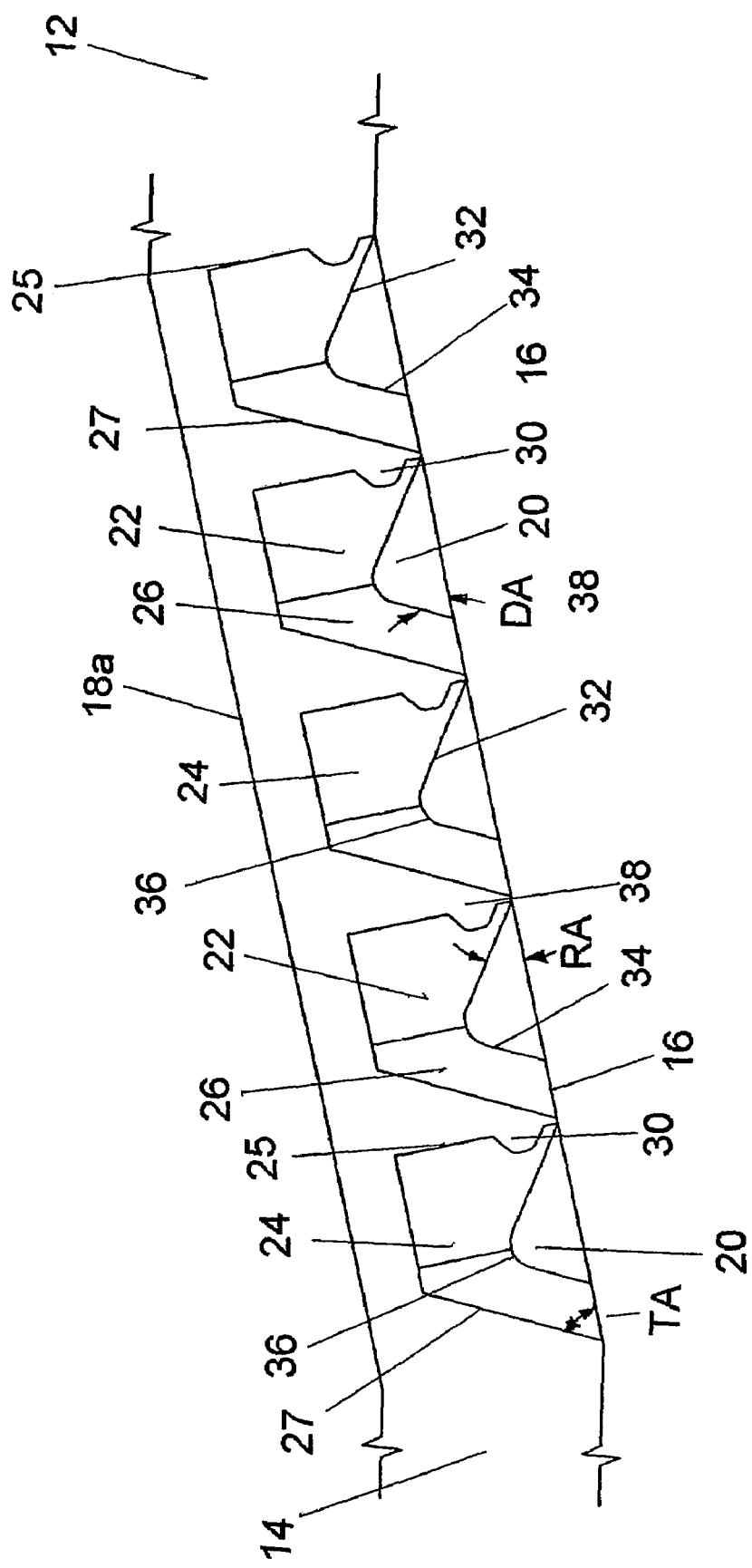
FIG. 3 is a cross-sectional elevation view through the fish ladder taken generally along line 3—3 in FIG. 1.

As is evident in FIG. 3, stair-steps 20 extend laterally from sidewall 18b toward sidewall 18a, terminating at divider portion 26 of baffle 22. Stair-steps 20 include a ramp portion 32 extending from bottom wall 16 at an angle RA, a dam portion 34 downstream of ramp portion 32 that extends from bottom wall 16 at an angle DA, and a curved transition portion 36 extending between ramp portion 32 and dam portion 34. A pool area 38 extends between dam portion 34 of one stair-step 20 and ramp portion 32 of the next downstream stair-step 20. Pool area 38 is in fluid communication with sheltered area 28, and it will be appreciated that pool area 38 may extend onto at least a portion of ramp portion 32 of the next downstream stair-step.

Figure 5:
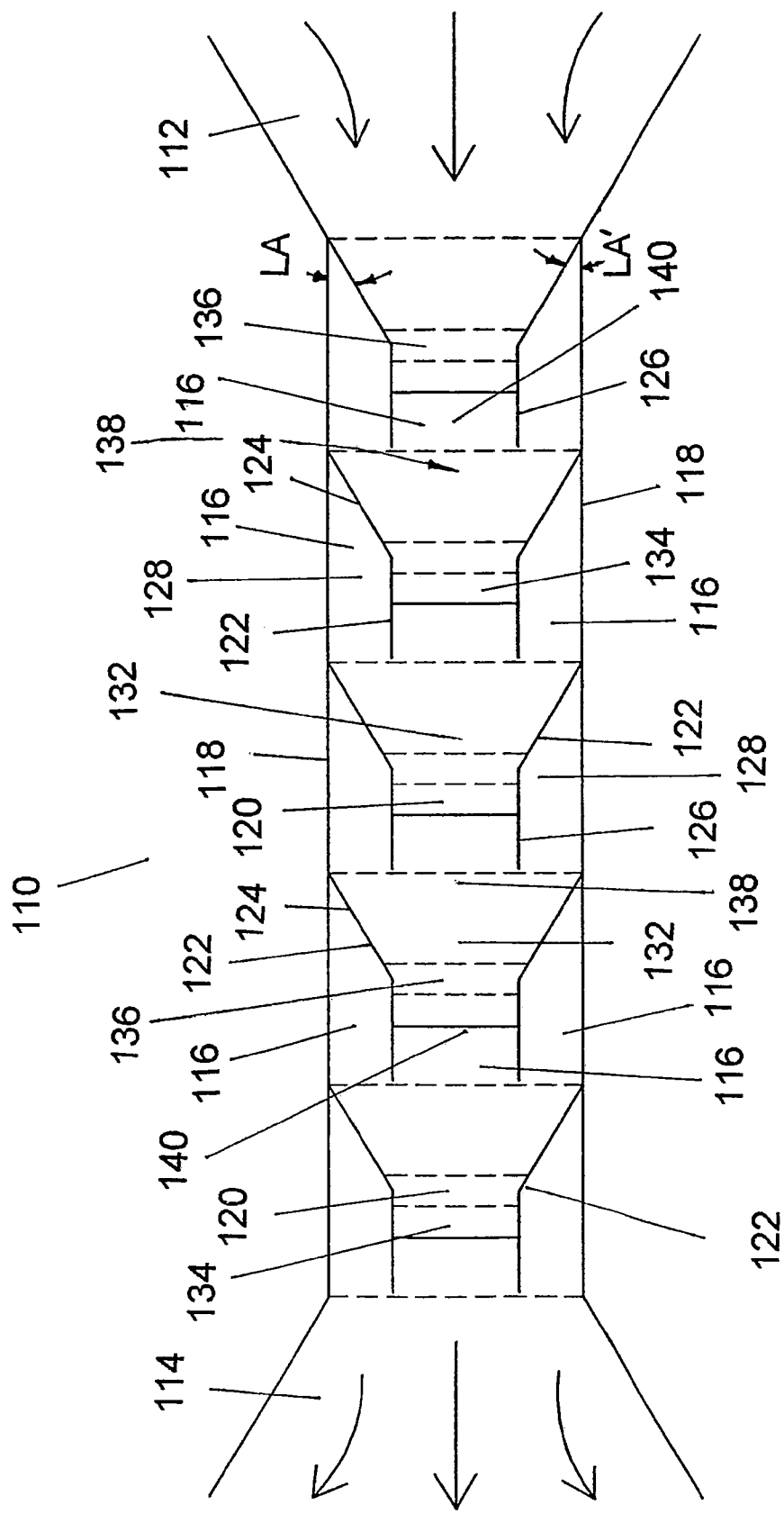
FIG. 5 is a plan view of another embodiment of a fish ladder in accordance with the present invention.

In an alternate embodiment illustrated in FIG. 5 of the drawings, fish ladder 110 extends between a flow inlet 112 and a flow outlet 114. The fish ladder has a bottom wall 116 from which a pair of spaced apart walls 118 extend upwardly. A series of baffles 122 are longitudinally spaced apart along or adjacent each of the walls 118 and project upwardly from bottom wall 116. Each baffle 122 preferably has a diverter portion 124 and a divider portion 126. Diverter portions 124, for example, extend from a respective wall 118 downstream at an angle LA toward the opposite wall 118. Additionally, it is contemplated that one of the two series of baffles may have a different angle LA' than the other of the two series of baffles. Diverter portions 124 each terminate at or merge into a divider portion 126 that extends longitudinally along ladder 110. As such, two laterally spaced-apart rows of divider portions extend longitudinally along ladder 110 forming a central flow channel 140 therebetween. In other words, the cross-section of the fish ladder is generally divided into thirds with baffles extending inwardly from each sidewall of the structure and divided by a centrally located central flow channel. This is in contrast to the side-by-side arrangement of FIGS. 1–4 where the baffles extend inwardly from one sidewall of the structure. Of course other arrangements and configurations of the baffle(s) and flow channel(s) can be used that serve the functions noted above without departing from the scope and intent of the present invention. In FIG. 5, a series of stair-steps 120 project from bottom wall 116. Each stair-step 120 is positioned adjacent a baffle 122 and laterally extends between divider portions 126 thereof. Stair-steps 120 include a ramp portion 132, a dam portion 134 and a curved transition portion 136 in the configuration previously described for stair-steps 20, as shown in FIGS. 1–4. Sheltered areas 128 are spaced along or adjacent to both walls 118 of fish ladder 110, and are defined by baffles 122, walls 118 and bottom wall 116 in a manner consistent with sheltered areas 28, as shown in FIGS. 1–4. Additionally, the diverter portion of each baffle 122 includes a flow passage (not shown), such as has been previously described for flow passage 30 and as shown in FIGS. 1–4, permitting water to flow through sheltered areas 128 and minimize the buildup of sediment. Pool areas 138 extend between dam portion 134 of one stair-step 120 and ramp portion 132 of the next downstream stair-step 120, and pool areas 138 are in fluid communication with sheltered areas 128 on both sides of fish ladder 110.

As discussed in the foregoing paragraphs with respect to FIGS. 1–5, the series of baffles (22 and 122) in each respective embodiment each includes a diverter portion (24, 124) and a divider portion (26, 126). It should be appreciated that other embodiments are contemplated in which these two portions may not be so clearly differentiated. For example, a baffle may be "s-shaped" having a diverter portion that extends tangentially from a sidewall and transitions through two sweeping arcs into a divider portion that extends longitudinally along the ladder between the two sidewalls. Alternately, the baffles may be formed from a generally straight wall extending at an angle from one side toward the opposing sidewall. In either case, the two portions of the baffles may not be readily apparent, though it should be understood that such embodiments may sufficiently perform the intended function of each portion and, therefore, be considered a baffle within the scope of the present invention.

While considerable emphasis has been placed herein on the structures and structural interrelationships between the features of the embodiment disclosed, it will be appreciated that other embodiments of the invention can be made and that many changes can be made in the embodiments illustrated and described without departing from the principles of the invention. For example, any of the numerous angles discussed above may be varied from one ladder to another as may be dictated by factors such as waterway size, anticipated flow conditions, or number, size and nature of the fish likely to migrate up the fish ladder, just to name a few. Additionally, the fish ladder may be constructed as illustrated in the drawings from a material such as metal, or the device may alternately be manufactured from other materials such as plastic, concrete, a composite material, etc. Furthermore, the fish ladder may be constructed in a non-unitary manner, such as in longitudinal sections, for example. Also, it is preferable that the fish ladder be prefabricated and otherwise ready for assembly or unitary installation. However, some situations may dictate that the fish ladder may be constructed or fabricated on-site. It is intended that the subject fish ladder include all of these and other contemplated variations in design, construction or assembly. Accordingly, it is to be distinctly understood that the foregoing descriptive matter is to be interpreted as merely illustrative of the present invention and not as a limitation.

The invention claimed is:

1. A fish ladder comprising:
   a longitudinally extending channel having a bottom wall, opposing first and second sidewalls, and opposing open ends;
   a series of projections spaced longitudinally along said channel between said open ends and extending upwardly from said bottom wall;
   a series of baffles, each spaced longitudinally along said channel adjacent one of said projections, each baffle including a diverter portion, that extends from the first sidewall in a downstream direction at an angle relative to the first sidewall, and a divider portion that extends longitudinally between the sidewalls; and
   a passage extending through at least a portion of at least one of said baffles.

2. The fish ladder of claim 1, wherein each of said projections extends laterally across a first portion of said channel, and each of said baffles extends laterally across a second portion of said channel.

3. The fish ladder of claim 2, wherein said first and second portions across said channel are approximately equal.

4. The fish ladder of claim 1, wherein each of said series of baffles initiates from adjacent a first of said opposing sidewalls and extends toward a second of said opposing sidewalls.

5. The fish ladder of claim 4 further including a passage extending through each of said series of said baffles.

6. The fish ladder of claim 4 further including a passage extending between at least one of said baffles and said adjacent sidewall.

7. The fish ladder of claim 1, wherein each baffle includes a first edge along said diverter portion that is adjacent said first sidewall, and a second edge along said divider portion that extends upwardly from said bottom wall at an acute angle.

8. The fish ladder of claim 1, wherein each of said projections includes a first portion extending upwardly from said bottom wall at a first angle and a second portion extending upwardly from said bottom wall at a second angle.

9. The fish ladder of claim 8, wherein said second angle is greater than said first angle.

10. The fish ladder of claim 1 further including a further series of baffles, each spaced longitudinally along said channel adjacent one of said projections and opposite said series of baffles.

11. The fish ladder of claim 10, wherein each of said series of baffles initiates from adjacent side first sidewall and extends toward said second sidewall and said further series of baffles initiates from adjacent said second sidewall and extends toward said first sidewall.

12. The fish ladder of claim 11 further including a passage extending through at least a portion of at least one of said baffles of each of said series and further series.

13. The fish ladder of claim 11 further including a passage extending between at least one of said baffles of each of said series and further series of baffles and said associated, adjacent sidewall.

* * * * *